March 5, 1963  J. A. CARFIZZI  3,080,096
CONTAINERS FOR FLOWABLE MATERIALS
Filed Nov. 4, 1960  2 Sheets-Sheet 1

Joseph A. Carfizzi
INVENTOR.

BY
AGENT,

March 5, 1963     J. A. CARFIZZI     3,080,096
CONTAINERS FOR FLOWABLE MATERIALS
Filed Nov. 4, 1960     2 Sheets-Sheet 2

Joseph A. Carfizzi
*INVENTOR.*

BY

AGENT.

3,080,096
CONTAINERS FOR FLOWABLE MATERIALS

Joseph A. Carfizzi, Brooklyn, N.Y., assignor to T.A.D. Trucking Corp., Brooklyn, N.Y., a corporation of New York Filed Nov. 4, 1960, Ser. No. 67,341
4 Claims. (Cl. 222—143)

My present invention relates to a shipping container adapted to serve for transporting and dispensing flowable materials such as liquids and comminuted bulk materials as, for instance, grains, powders and flakes.

Containers of the type described above should be of such shape and construction as to make the storage and handling of the transported materials as easy, as economical and as safe as possible. They should have a good ratio of useful to dead weight and a suitable shape for vertical stacking and horizontal juxtapositioning with optimum utilization of the available space.

It is an object of this invention to provide a container for materials of the type described which can be handled in a convenient, safe and economical manner during transportation and storage as well as during the dispensing of its contents.

It is a further object of this invention to provide a container of rigid, strong and shock-resistant construction so as to make the transportation, handling and storing of even a relatively heavy load of material as safe as possible.

It is a still further object of this invention to provide a container of such shape that a number of such containers, nested together on a transportation vehicle form a flat platform, which can be further utilized for the stacking of other containers or for the transportation of other goods, whereby the containers are also prevented from shifting during transportation.

Another object of this invention is to provide a container suitable for the dispensing of materials with dissimilar running characteristics.

The container according to my invention is of rectangular cross-section in two transverse planes and has an outline, in a plane perpendicular thereto, which is generally butterfly-shaped and may be considered as a rectangle with one of its sides staved in over substantially its entire length and the opposite side correspondingly bulging out, thus forming a recess on one side and a projection on the other side which are congruent and preferably at least roughly in the shape of a symmetrical trapezoid. The container, accordingly, has two flat, parallel faces which during normal storage and handling are horizontal so as to form a bottom wall and a top wall; two normally vertical side walls parallel to each other; and two parallel end walls, also normally vertical, of which one is flared inwardly at or near its junctions with the side walls while the other is correspondingly flared outwardly in complementary fashion whereby a plurality of identical units of this description may be horizontally nested in one another. The outwardly flared end wall, whose flanks enclose an angle between about 15° and 60° (preferably 30°) with a plane perpendicular to the side walls, forms a funnel or dispensing chute through which the contents of the vessel are directed toward a discharge opening or spout at the minor base of the trapezoid when the container is tilted from its normal horizontal position into an inclined or vertical position. The opposite, inwardly flared end wall may be provided with a closable port, advantageously equipped with a check valve, to balance the atmospheric pressure acting upon the spout from without.

The above and other objects and features of the invention will become more fully apparent from the following detailed description of several embodiments, reference being made to the accompanying drawing in which:

FIG. 2 is a partly cut-away bottom view of a container according to my invention, drawn to a larger scale;

FIGS. 3A and 3B are fragmentary sectional views taken on the lines IIIA—IIIA and IIIB—IIIB, respectively, of FIG. 3;

FIG. 4 is a partly cut-away top view of a slightly modified container according to the invention;

FIG. 5A is a fragmentary sectional view taken on the line VA—VA of FIG. 5;

Figure 1:
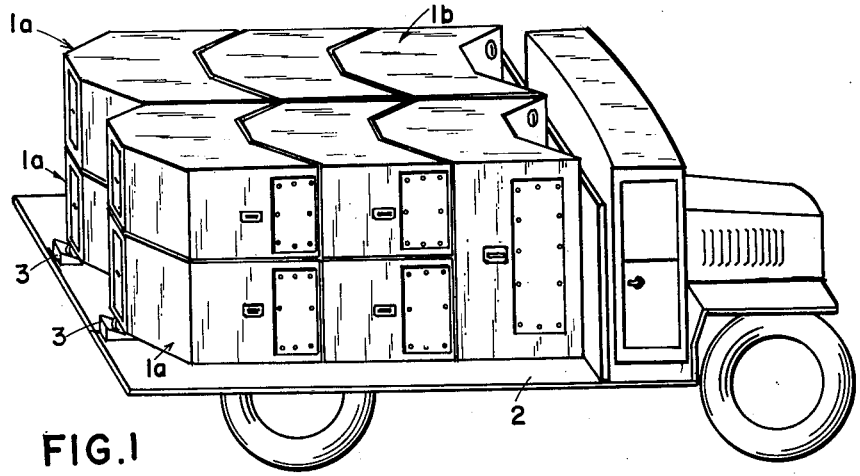
FIG. 1 shows a plurality of containers according to my invention stacked and nested on the platform of a truck.

In FIG. 1 a plurality of smaller-size containers 1a and at least one larger-size container 1b (e.g. of sheet aluminum) are verticaly stacked on top of each other and horizontally nested behind each other on a platform 2 of a truck. Wedges 3 serve to keep the containers 1a and 1b from shifting during transportation. As can be seen from this figure, the shape of the containers makes it possible to utilize most of the available space on the platform 2. The containers fit conveniently into one another and form a flat platform on which it is possible to place further containers or other goods.

The container 1a, considered to be of unit height in contradistinction to the two-unit-high container 1b, is shown in greater detail in FIGS. 2, 3, 3A and 3B. The container body is preferably made of sheet metal, but other suitable materials such as plastics could also be used. The container is strengthened and made more rigid by brackets 4 on the inside corners of the side walls 22, 22'. A door 6 used for filling the container and dispensing the contents is installed in the convex front wall of the container in the center of the funnel of trapezoidal outline formed by two inclined, outwardly flared wall portions 21, 21'. The door 6 is slidable in two side grooves formed between bent-over edges of front portions 21, 21' and a pair of strips 5, 5' welded thereto. A handle 7 is swingably fastened in a holder 25 which forms a depression in the door. Similar handles 9 and 9', which serve for hoisting the container, are lodged in holders 10, 10' forming depressions in the side walls 22, 22'. Preferably both the handles 9 and 9' are placed so as to lie in one line with the center of gravity of the container in order to make it easier to tilt the container around a horizontal axis passing through the centers of these handles. A check valve 14 in the rear part of the container permits air to enter the container and to equalize the pressure above the level of the contents when the container is being discharged. The container is also shown provided with skids 23 bolted to its flat bottom wall 24. The skids serve for transportation over short distances and are easily detachable. A further door 11 in the rear part of side wall 22' is fastened to brackets 12 mounted inside the container by countersunk bolts 13. The door 11 serves to give access to the interior of the container for cleaning and repairs.

The rear wall of container 1a is formed by inwardly inclined lateral portions 31, 31' and a narrow center portion 31" matching the width of sliding door 6. The projecting front wall 21, 6, 21' and the recessed rear wall 31, 31", 31' define the outlines of two congruent trapezoids as best seen in the plan view of FIG. 2.

Figures 2, 3B, 4:
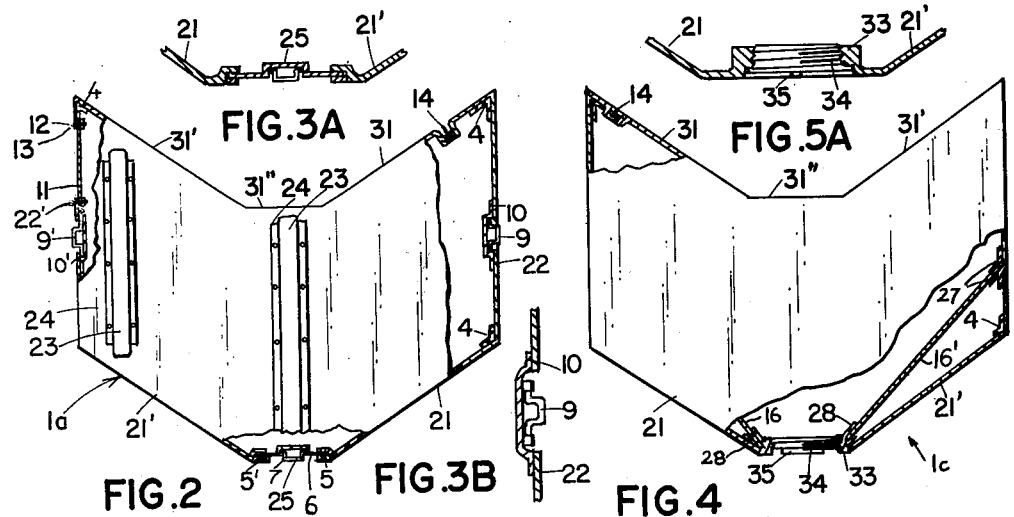
Figure 3:
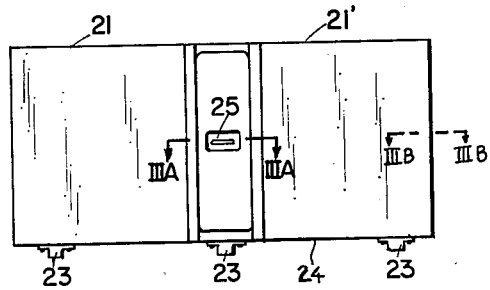
FIG. 3 is a front view of the container of FIG. 2.
Figure 5:
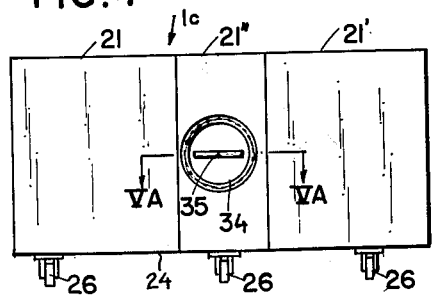
FIG. 5 is a front view of the container shown in FIG. 4.

The container 1c of FIGS. 4, 5 and 5A is generally similar to the vessel 1b, except that its front wall has a narrow central portion 21" co-extensive with rear portion 31″. Portion 21″, defining the minor base of the trapezoid, is provided with a threaded circular spout hole 33 into which a complementary plug 34 is removably screwed; this plug is provided with a grip 35.

FIG. 4 also illustrates the manner in which a container according to my invention can be adapted to use with goods which do not flow as readily as most liquids and granular materials. With highly viscous fluids, for example, I prefer to provide it with a false bottom in the form of inserts 16, 16′ which diverge from the wall portions 21, 21′, e.g. at an angle of 15°, to afford a steeper slope when such materials are to be dispensed. These inserts are firmly secured from within to the side walls 22, 22′ by means of brackets 27 and to the central front-wall portion 22″ by means of similar brackets 28.

The skids 23 of the preceding embodiment have been replaced in FIGS. 4 and 5 by casters 26 suitably journaled on the bottom wall 24 of container 1c.

Figure 6:
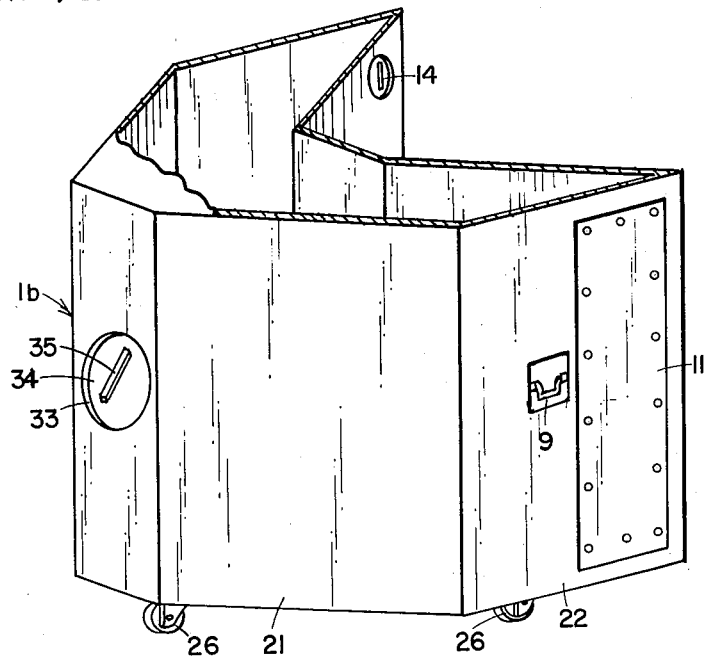
FIG. 6 is a perspective view of a container similar to that shown in FIGS. 4, 5 and 5A.
Figures 7, 8:
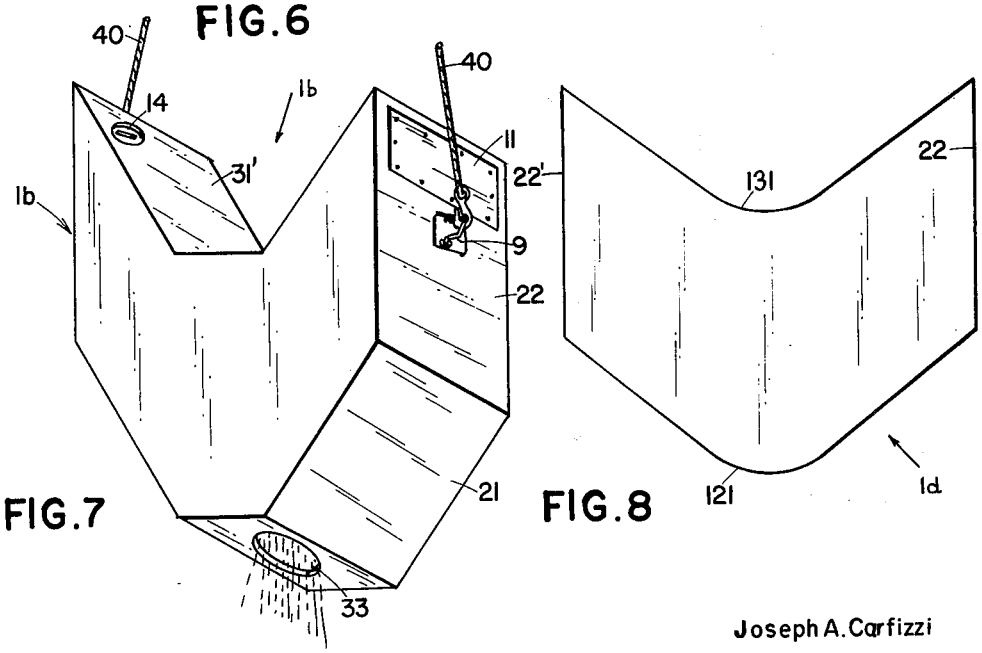
FIG. 7 is a view of the container of FIG. 6 shown in the discharging position.
FIG. 8 is a top view of a further embodiment.

The double-size container 1b shown in greater detail in FIGS. 6 and 7 is similar in its external construction to the container 1c just described and like reference numerals have been given in these figures to parts already mentioned. FIG. 7 illustrates how this container, upon removal of its plug 34, can be emptied via spout 33 upon being suspended from above by cables 40 hooked onto its handles 9.

FIG. 8 illustrates a further container 1d which differs from the one heretofore discussed in that its complementary front and rear walls 121, 131 are rounded, rather than angular, although retaining the same general configuration. A suitable discharge opening, not shown, will again be provided at the center of front wall 121.

A particular advantage of my invention, readily apparent from FIG. 1, is that containers of different capacities can be readily nested and juxtaposed if the larger containers have the same outline as the smaller ones but heights that are multiples of a unit height, e.g. as illustrated for the single-unit containers 1a and the double-unit container 1b. The use of inserts 16, 16′, when required, reduces the capacity of the container but slightly and does not affect its outer configuration so that stacking and nesting can be carried out irrespectively of the presence or absence of such inserts.

My invention is, of course, not limited to the precise configurations and details of construction described and illustrated but may be embodied in various modifications and adaptations without departing from the spirit and scope of the appended claims. Thus, it is possible, for example, to make at least the side and the end walls of the container from flexible material whereby the same can be collapsed when empty.

I claim:

1. A shipping container for bulk material, comprising a hollow body with parallel side walls, parallel top and bottom walls, and parallel end walls, said end walls being complementarily convex and concave, respectively, whereby said body can be nestingly juxtaposed with the body of an identical container, said end walls being each formed with two inclined lateral portions adjoining said side walls and with a narrower central portion defining the minor base of a trapezoid whose nonparallel sides are formed by said lateral portions, the latter including angles ranging between substantially 15° and 60° with said central portion, the central portion of said convex end wall being provided with an outlet opening for the discharge of a flowable material from the interior of the container upon displacement of said body into an erect position in which said outlet opening is at the lowest point thereof, said body being further provided with an access opening remote from said outlet opening; separate closure means for said access and outlet openings; and antifriction support means for said container on the underside of said bottom wall.

2. A container according to claim 1 wherein the inclination of said lateral portions relative to said central portion is substantially 30°.

3. A container according to claim 1 wherein said trapezoid is symmetrical.

4. A container according to claim 1, further comprising inserts adjacent the lateral portions of said convex end wall forming a false floor of greater inclination with respect to said central portion in said erect position of said body.

References Cited in the file of this patent

UNITED STATES PATENTS

| 1,190,203 | Sorge | July 4, 1916 |
| 1,330,780 | Bonte | Feb. 17, 1920 |
| 2,488,611 | Stallings | Nov. 22, 1949 |
| 2,620,079 | Rosenbaum | Dec. 2, 1952 |
| 2,622,771 | Tulou | Dec. 23, 1952 |
| 2,780,922 | Johnnesen | Feb. 12, 1957 |
| 2,862,645 | Page et al. | Dec. 2, 1958 |

FOREIGN PATENTS

| 35,866 | Denmark | Apr. 12, 1926 |